Figure 1:
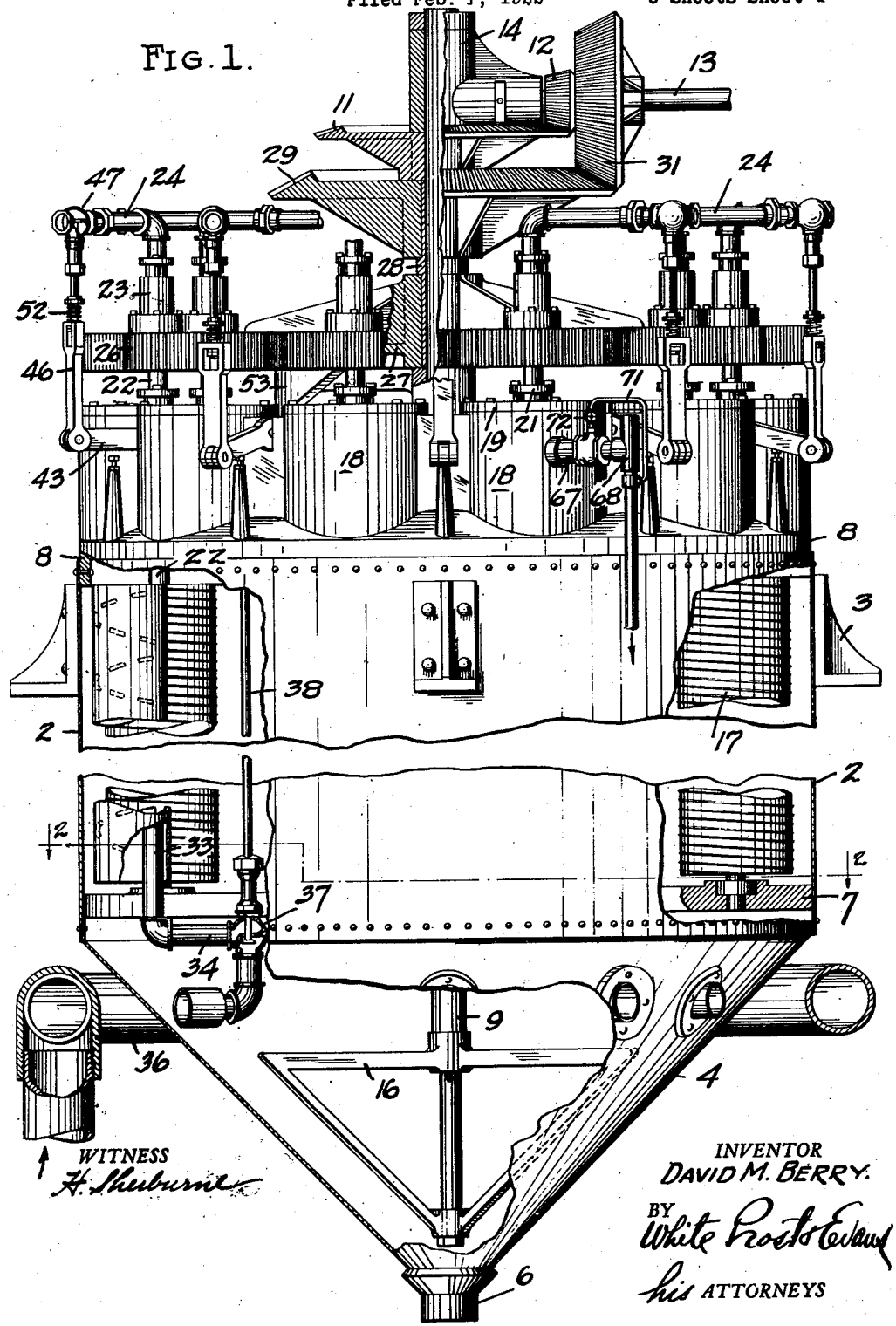

Nov. 25, 1924.

D. M. BERRY

THICKENING FILTER

Filed Feb. 1, 1922

1,516,702

3 Sheets-Sheet 1

WITNESS

INVENTOR
DAVID M. BERRY.
BY
his ATTORNEYS

Nov. 25, 1924.
D. M. BERRY
THICKENING FILTER
Filed Feb. 1, 1922
1,516,702
3 Sheets-Sheet 2
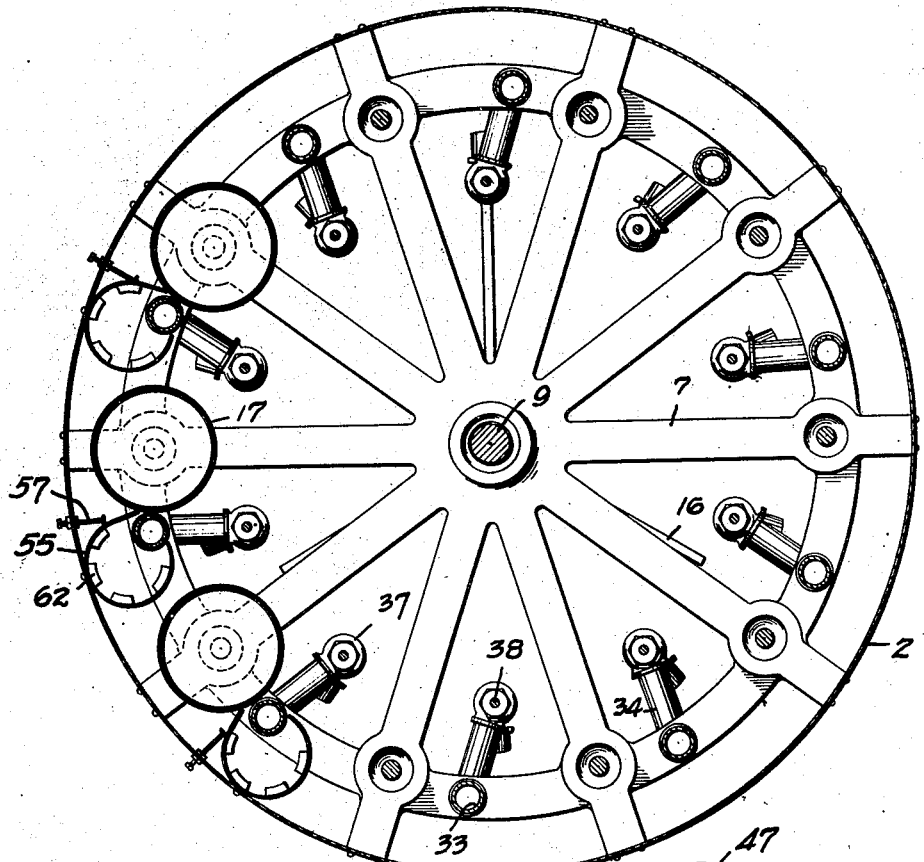
FIG. 2.
FIG. 3.
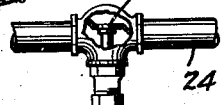
WITNESS
H. Sherburne
INVENTOR
DAVID M. BERRY.
BY
White Prost Evans
his ATTORNEYS Nov. 25, 1924. 1,516,702
D. M. BERRY
THICKENING FILTER
Filed Feb. 1, 1922   3 Sheets-Sheet 3
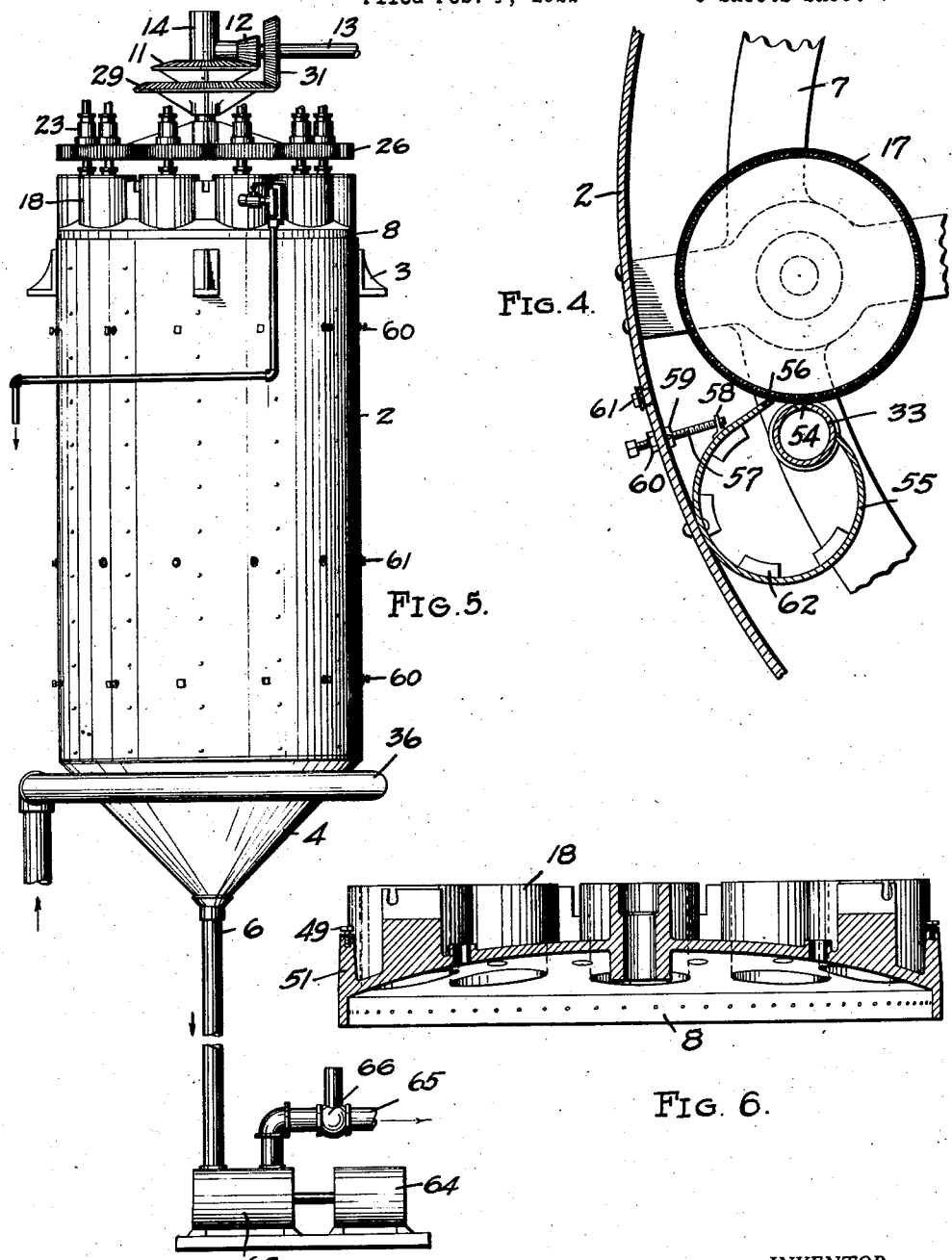
WITNESS
H. Sherburne
INVENTOR
DAVID M. BERRY
BY
White Prost & Evans
his ATTORNEYS Patented Nov. 25, 1924.

1,516,702

UNITED STATES PATENT OFFICE.

DAVID M. BERRY, OF OAKLAND, CALIFORNIA.

THICKENING FILTER.

Application filed February 1, 1922. Serial No. 533,475.

*To all whom it may concern:*

Be it known that I, DAVID M. BERRY, a citizen of the United States of America, and a resident of Oakland, county of Alameda, and State of California, have invented a new and useful Thickening Filter, of which the following is a specification.

My invention relates to filters and particularly to filters for increasing the density of the liquid handled by it.

The objects of the invention include the provision of a thickening filter capable of continuous operation, and characterized by simplicity of construction, automatic control of operation and large capacity.

My invention possesses many other objects and features of advantage, some of which, with the foregoing, will be set forth in the following description of my invention. It is to be understood that I do not limit myself to the showing made by the said description, as I may adopt variant forms of my invention within the scope of the claims.

In the drawings, Fig. 1 is an elevation, partly in section, of my thickening filter. Fig. 2 is a horizontal section taken in two planes indicated by the line 2—2 of Fig. 1. Fig. 3 is a detail view in vertical section of a portion of the mechanism of my filter. Fig. 4 is a horizontal sectional view showing a portion of the structure shown in Fig. 2, on a larger scale. Fig. 5 is an elevation of my complete apparatus. Fig. 6 is a vertical sectional view thru the top of the main tank.

In general terms the thickening filter of my invention comprises a closed tank adapted to hold the material to be treated and having a conical bottom. Arranged vertically in the tank and spaced circumferentially therein at regular intervals are filter drums upon the outside surface of which the cake accumulates. Means are provided for slowly rotating the filter drums. Adjacent each filter drum is a jet pipe fed by the material to be filtered and arranged to project a jet of the material against the surface of the filter drum. Means are provided for removing the filtrate from the interior of the filter drums and valves are arranged in the filtrate discharge passages and in the inlet passages to the jet pipes, so that the flow of filtrate from each filter drum, and the flow of material to each jet pipe may be controlled. Material is supplied to the jet pipe under pressure, and means are provided for closing the filtrate discharge valve and then opening the jet pipe feed valve for each filter drum in succession. The filter cake builds up on the surface of the filter drum during its slow rotation, and when the jet pipe feed valve is opened, a jet of the material impinges upon the filter drum to dislodge the accumulated cake. Since the filtrate discharge valve closes just before the jet pipe feed valve opens, the pressure is equalized on both sides of the filter drum surface so that "clinging" of the cake, which follows a lower pressure on the discharge side of the filter is avoided. The feed valve for one jet pipe is opened before the preceding one is closed so that constant pressure is maintained in the material in the tank. This is done to avoid a "blow-back" and loosening of the cake at the wrong time due to excess of pressure on the interior surface of the filter drums. Adjustable means are also provided adjacent each filter drum for maintaining the filter bed formed by the accumulating cake at a predetermined thickness, and removing the cake deposited in excess of such thickness as the filter drum revolves. Such means also catches the cake loosened by the jet and provides means for conducting the thickened material to the bottom of the tank where a stirring mechanism insures a thickened material of uniform density. The thickened material is discharged thru a back pressure valve set a few pounds higher than the pressure in the tank so that the discharge pump draws a steady stream at constant pressure.

More particularly my device comprises a tank 2 carried by the brackets 3 which are in turn supported on any suitable frame work. The tank is provided with a conical bottom 4 which leads into the discharge pipe 6. At the lower end of the cylindrical portion of the tank is arranged a spider 7, and in suitable bearings in the spider and in the top 8 of the tank, a shaft 9 is journaled. The shaft 9 is driven by the gear 11, fixed near its upper end and meshing with the pinion 12 on the shaft 13, which is rotated by any suitable means. Both shaft 9 and shaft 13 are journaled in the bearing block 14, which is supported on the two shafts as well as providing support for them. Stirring blades 16 are provided on the lower end of the shaft 9.

Journaled in suitable bearings in the spider 7 and on the top 8, and spaced circumferentially about the interior of the tank at regular intervals, are a plurality of filter drums 17. Preferably each filter drum comprises a foraminated cylindrical shell covered with a filter cloth held in place by spiral turns of wire in accordance with known practice. The top 8 of the tank is provided with upstanding cylindrical flanges 18 each of a diameter somewhat larger than the filter drum which is mounted directly below it in the tank. Each cylindrical flange is covered by a plate 19 provided with a stuffing box bearing 21 in which the upper end of the shaft 22 projecting from the upper end of the filter drum is journaled. The shaft 22 is hollow and in communication with the interior of the filter drum and at its upper end is enclosed within the stuffing box 23 which provides a connection with the fixed discharge pipe 24. Fixed on each shaft 22 is a spur gear 26, and all of these spur gears are in mesh with a large central spur gear 27 which is fixed on the sleeve 28 rotatably mounted on the shaft 9. On the upper end of the sleeve which terminate just below the gear 11, is the bevel gear 29 in mesh with the large pinion 31 fixed on the shaft 13 adjacent the pinion 12.

From the above it will be clear that by disconnecting the pipe 24 and cover plate 19 associated with a given filter drum, such filter drum, in case it is desired to make any repairs on it, may be lifted out of the tank without disturbing any of the other mechanism. A blank cover plate may then be secured to the vacant cylindrical flange 18 and the rest of the filter will operate as before, of course however with lessened output due to the decrease of the filtering surface. It will also be observed that the rotation of the shaft 13 not only effects the rotation of the stirring blades 16 in the bottom of the tank but also effects the slow rotation of each filter drum about its own axis. A speed of preferably one revolution per minute in the shaft 13 will impart a speed of one-fifth revolution per minute to gear 11 and the shaft 9, and one-half revolution per minute to gear 29 and gear 27, and 2.41 revolutions per minute for each of the filter drums. Of course other proportions and speeds may be adopted, but I find those stated give good results.

Parallel to each drum and closely adjacent thereto is a jet pipe 33. The jet pipe is supported from the spider 7 and is connected by pipe 34 with a manifold 36 which surrounds the base of the tank, and into which the material to be filtered is pumped under pressure. Passage of material to the jet pipe is controlled by the valve 37 operated by the rod 38 which terminates in a head 39, Fig. 3, after passing through a stuffing box 41 disposed on the top 8 of the tank.

A spring 42, interposed between the head 39 and the stuffing box, tends to keep the rod in the upper position in which the valve 37 is closed. The upper end of the rod 38 is disposed below the inner end of the lever 43 which on the same end is provided with a roller 44, and on the outer end is connected by the link 46 to the valve 47 which is placed in the filtrate discharge pipe 24. Normally a spring 48 retains the lever upon a stop 49 adjustably disposed in a stud 51 formed on the top 8. In this position the filtrate discharge valve 47 is in the open position. Thus the jet pipe feed valve 37 and the filtrate discharge valve 47 for each filter drum are interconnected, and both operated by movement of the lever 43. A spring 52 is interposed between the link 46 and the valve 47 and the arrangement of parts is such that the filtrate discharge valve 47 is fully closed by movement of the lever 43 before the jet pipe feed valve 37 is opened.

Means are provided acting in time with the rotation of the filter drums for operating the various levers 43 in succession. Fixed for rotation with the shaft 9, just below the gear 27, is a cam 53 so positioned as to engage the rollers 44 successively as the shaft 9 revolves. When the cam engages a roller 44 the lever 43 is tipped to first close the associated filtrate discharge valve and then immediately after open the corresponding jet pipe feed valve. As the cam leaves the roller 44 the feed valve closes and the filtrate discharge valve opens. Movement of the parts is so timed that before one jet pipe feed valve closes the next succeeding one opens so that the pressure within the tank remains constant. As best shown in Fig. 4, the jet pipe is formed with a tangentially opening slot 54 extending longitudinally thereof. The jet pipe is placed close to the filter drum so that the jet strikes the filter drum in a tangential direction.

Means are provided for receiving the cake loosened by the jet and conducting it into the bottom portion of the tank. Secured to the side of the tank and extending vertically upward by each filter drum is a cylindrical or tubular shell 55 having a longitudinally extending opening in the side thereof in which the jet pipe lies. The jet pipe is contiguous to one edge of the opening but a narrow space is left between the opposite side of the jet pipe and the other edge of the tubular member, which is formed as shown in Fig. 4 to provide a cutting edge or scraper 56 adapted to lie close to the filter drum but not in contact therewith. Each tubular member is secured to the side of the tank and the scraper edge may be rocked to one side or the other by the adjusting screws 57 so that the position of the scraper edge relative to the filter drum may be closely determined. Each adjusting screw is threaded thru a lug 58 on the side of the tubular member and is provided with a fixed collar 59 bearing against the inside of the tank. A lock nut 60 provided with suitable packing material thereunder seals the joint with the tank. Suitably placed openings in the tank wall normally closed by plugs 61 are arranged so that the scraper edge may be seen when it is adjusted.

By adjustment of the scraper edge the thickness of the filter cake accumulated on the filter drum may be closely regulated. The arrangement of the parts is such that the jet from the jet pipe impinges upon the filter cake just in front of the scraper edge and its effect is to carry into the tubular conductor the loosened material which is therefore given a whirling motion. A downward direction is imparted to the whirling material by means of spirally arranged fins 62. At the bottom the thickened material emerges to be caught by the stirring blade and thoroughly mingled with the other material at the bottom of the tank. The discharge pipe 6 is preferably connected into a pump cylinder 63, the piston of which is preferably directly connected to the piston in the steam cylinder 64. The pump discharges into the line 65 in which a back pressure valve 66 is arranged. The back pressure valve is set a few pounds, say 5, higher than the pressure in the drum so that a steady stream at constant pressure is delivered to the line 65.

In some cases it may be desirable to increase the velocity of the jet. This may result in a greater quantity of material entering the tank than can be taken care of thru the filtrate discharge valves and the normal flow of thickened material thru the discharge pipe 6. In order to provide for this situation a vent pipe 67 is arranged in the top of the tank. A back pressure valve 68 set a few pounds in excess of the normal pressure in the tank is arranged in the pipe which discharges into the main body of material from which the feed pump draws to supply the manifold 36. Means are provided for permitting the escape of entrained gases in the tank. A small pipe 71 is connected thru the globe valve 72 with the pipe 67 and the other end connected into the pipe on the opposite side of the back pressure valve 68. The globe valve 72 is cracked open and when the back pressure valve is closed it acts as a bleeder and to permit the entrained gases to escape. A man hole closed by a suitable cover plate is provided in the side of the tank to permit the entrance of a workman if necessary.

*Operation.*—The supply of material to be filtered is continuously being introduced into the tank by the jets, which also serve to loosen the filter cakes which are constantly building up on the filter drums as they rotate within the material which surrounds them. The scraper blade adjacent each drum prevents the building up of too thick a cake. Any excess of cake beyond the prescribed thickness is scraped off of the filter drum by the edge, and because of its higher density tends to sink thru the material in the tubular conductor to the bottom of the tank. As the cam 53 engages the roller 44 associated with a particular filter drum unit the filtrate discharge valve is closed so that the pressure of the filtrate within the filter drum is equal to that of the material on the outside of the drum. At this instant the jet pipe feed valve is opened and a sheet of the material to be filtered impinges upon the filter cake closely adjacent to the scraper edge, loosening the cake from the filter surface and propelling it into the tubular conductor in which it is rapidly conducted to the bottom of the tank. In the apparatus shown, I prefer a jetting period of about one-half minute, and five minutes is needed for a complete cycle around the ten filter drums shown. Before one jet stops the next succeeding one begins so that there is no variation in the pressure of the material in the tank. Thus the operation proceeds about the drums successively, a continuous stream of filtrate and of thickened material being discharged from the machine, the filtering medium being maintained in condition for continuous operation by the means shown.

Because of the continuous operation of my machine, heated materials may be handled with a minimum of heat losses, and it will be observed that the efficiency of my apparatus is not impaired by reversal of filtrate currents.

It will be observed that the material to be filtered is fed to the jet pipe from the bottom so that any pocket in which the solids of the material might collect to clog the pipe during the non-jet period is avoided.

I claim:

1. A filter comprising a tank adapted to hold the material to be filtered, a filter drum rotatably arranged in said tank, means for directing a jet of the material to be filtered against said filter drum to dislodge the cake thereon, and a tubular conductor discharging adjacent the bottom of said tank arranged parallel to said filter drum and provided with a longitudinal opening to receive the loosened cake.

2. A filter comprising a tank adapted to hold the material to be filtered, a filter drum rotatably arranged in said tank, means for directing a jet of the material to be filtered against said filter drum to dislodge the cake thereon, and a tubular conductor discharging adjacent the bottom of said tank provided with a longitudinal opening to receive the loosened cake, the edge of said opening forming a scraper arranged adjacent the surface of said filter drum.

3. A filter comprising a tank adapted to hold the material to be filtered, a filter drum rotatably arranged in said tank, means for directing a jet of material to be filtered against said filter drum to dislodge the cake thereon, and a tubular conductor discharging adjacent the bottom of said tank provided with a longitudinally extending scraper edge arranged adjacent the surface of said filter drum near the line of impingement of said jet, said conductor having a longitudinally extending opening adjacent said scraper edge thru which the loosened cake may enter the conductor.

4. A filter comprising a tank adapted to hold the material to be filtered, a filter drum rotatably arranged in said tank, means for directing a jet of the material to be filtered against said filter drum to dislodge the cake thereon, a tubular conductor discharging adjacent the bottom of said tank arranged parallel to said filter drum and provided with a longtiudinal opening to receive the loosened cake, and spirally arranged means disposed on the inside of said conductor to direct the material therein toward the discharge end.

5. A filter comprising a tank adapted to hold the material to be filtered, a filter drum rotatably arranged in said tank, means for directing a jet of the material to be filtered against said filter drum to dislodge the cake thereon, means for directing the loosened cake to the bottom of said tank, means for removing the filtrate from said filter drum, and means for interrupting the discharge of filtrate from said filter drum during the impingement of the jet on said filter drum.

6. A filter comprising a tank adapted to hold the material to be filtered, a filter drum rotatably arranged in said tank, means for directing a jet of the material to be filtered against said filter drum to dislodge the cake thereon, means for directing the loosened cake to the bottom of said tank, means for removing the filtrate from said filter drum, and means for interrupting the discharge of filtrate from said filter drum shortly before and during the impingement of the jet on said filter drum whereby the pressure is equalized on both sides of said filter drum.

7. A filter comprising a tank adapted to hold the material to be filtered, a filter drum rotatably arranged in said tank, means for intermittently directing a sheet jet of the material to be filtered against said filter drum during a complete revolution thereof, means for directing the loosened cake to the bottom of the tank, means for agitating the thickened material at the bottom of the tank to secure uniform density thereof, means for continuously removing the thickened material from the bottom of the tank, and means for removing the filtrate from the filter drum.

8. A filter comprising a tank adapted to hold the material to be filtered, a filter drum rotatably arranged in said tank, means for intermittently directing a sheet jet of the material to be filtered against said filter drum during a complete revolution thereof to dislodge the cake accumulated during the non-jet period, means for removing the filtrate from the filter drum during said non-jet period, means for directing the loosened cake to the bottom of said tank, means for agitating the thickened material at the bottom of the tank to secure uniform density thereof, and means for continuously removing the thickened material from the bottom of the tank.

9. A filter comprising a tank adapted to hold the material to be filtered, a filter drum rotatably arranged in said tank, means for directing a jet of the material to be filtered against said filter drum to dislodge the cake thereon, means for directing the loosened cake to the bottom of said tank, means for removing the filtrate from said filter drum, means for interrupting the discharge of filtrate from said filter drum during the impingement of the jet on said filter drum, and means for continuously evacuating the thickened material from the bottom of the tank.

10. A filter comprising a tank adapted to hold the material to be filtered, a filter drum rotatably arranged in said tank, means for intermittently directing a sheet jet of the material to be filtered against said filter drum during a complete revolution thereof to dislodge the cake accumulated during the non-jet period, means for directing the loosened cake to the bottom of said tank, and means for rotating said filter drum.

11. A filter comprising a tank adapted to hold the material to be filtered, a filter drum rotatably arranged in said tank, a jet pipe adjacent the filter drum, means for supplying material to be filtered to said jet pipe at intervals whereby a jet of said material is directed against the cake accumulated on said filter drum during the non-jet period, and means for directing the loosened cake to the bottom of said tank.

12. A filter comprising a tank adapted to hold the material to be filtered, a filter drum rotatably arranged in said tank, a jet pipe adjacent the filter drum, means for supplying material to be filtered to said jet pipe at intervals whereby a jet of said material is directed against the cake accumulated on said filter drum during the non-jet period, and a tubular conductor provided with a longitudinal opening thru which the loosened cake is impelled by said jet for directing the loosened cake to the bottom of said tank.

13. A filter comprising a tank adapted to hold the material to be filtered, a filter drum rotatably arranged in said tank, a jet pipe adjacent the filter drum, means for supplying material to be filtered to said jet pipe at intervals whereby a jet of said material is directed against the cake accumulated on said filter drum during the non-jet period, and a tubular conductor provided with a longitudinal opening thru which the loosened cake is impelled by said jet for directing the loosened cake to the bottom of said tank, the edge of said opening forming a scraper arranged adjacent the surface of said filter drum.

14. A filter comprising a tank adapted to hold the material to be filtered, a filter drum rotatably arranged in said tank, a jet pipe adjacent the filter drum, means for supplying material to be filtered to said jet pipe at intervals whereby a jet of said material is directed against the cake accumulated on said filter drum during the non-jet period, a tubular conductor provided with a longitudinal opening thru which the loosened cake is impelled by said jet for directing the loosened cake to the bottom of said tank, the edge of said opening forming a scraper arranged adjacent the surface of said filter drum, and means for adjusting the position of said scraper edge to vary the maximum thickness of the filter cake formed on said filter drum.

15. A filter comprising a tank adapted to hold the material to be filtered, a filter drum rotatably arranged in said tank, a jet pipe adjacent the filter drum, means for supplying material to be filtered to said jet pipe at intervals whereby a jet of said material is directed against the cake accumulated on said filter drum during the non-jet period, a tubular conductor provided with a longitudinal opening thru which the loosened cake is impelled by said jet for directing the loosened cake to the bottom of said tank, and a scraper arranged adjacent the surface of said filter drum for deflecting said loosened cake thru said opening.

16. A filter comprising a tank adapted to hold the material to be filtered, a filter drum rotatably arranged in said tank, a jet pipe adjacent the filter drum, means for supplying material to be filtered to said jet pipe at intervals whereby a jet of said material is directed against the cake accumulated on said filter drum during the non-jet period, a tubular conductor provided with a longitudinal opening thru which the loosened cake is impelled by said jet for directing the loosened cake to the bottom of said tank, a scraper arranged adjacent the surface of said filter drum for deflecting said loosened cake thru said opening, and means for adjusting said scraper relative to the surface of said filter drum.

17. A filter comprising a tank adapted to hold the material to be filtered, a filter drum rotatably arranged in said tank, a jet pipe adjacent the filter drum for directing a jet against said filter drum to dislodge the cake thereon, means for directing the loosened cake to the bottom of said tank, means for supplying the material to be filtered to said jet pipe, means for discharging the filtrate from said filter drum, means for interrupting the discharge of filtrate from said drum at regular intervals, and means for interrupting the flow of material to said jet pipe while the filtrate is discharging.

18. A filter comprising a tank adapted to hold the material to be filtered, a filter drum rotatably arranged in said tank, a jet pipe adjacent the filter drum for directing a jet against said filter drum to dislodge the cake thereon, means for directing the loosened cake to the bottom of said tank, means for supplying the material to be filtered to said jet pipe, means for discharging the filtrate from said filter drum, a feed valve for controlling the flow of material to said jet pipe, a discharge valve for controlling the flow of filtrate thru said discharging means, and means for operating said valves whereby the discharge valve is closed before the feed valve is opened.

19. A filter comprising a tank adapted to hold the material to be filtered, a filter drum rotatably arranged in said tank, a jet pipe adjacent the filter drum for directing a jet against said filter drum to dislodge the cake thereon, means for directing the loosened cake to the bottom of said tank, means for supplying the material to be filtered to said jet pipe, means for discharging the filtrate from said filter drum, a feed valve for controlling the flow of material to said jet pipe, a discharge valve for controlling the flow of filtrate thru said discharging means, means for rotating said filter drum, and means acting in time with the movement of said filter drum for operating said valves whereby the discharge valve is closed before the feed valve is opened.

20. A filter comprising a tank adapted to hold the material to be filtered, a plurality of filter drums rotatably arranged in said tank, means for rotating said filter drums, a jet pipe adjacent each drum for directing a jet of the material to be filtered against said filter drum to dislodge the cake thereon, a discharge valve for controlling the flow of filtrate from each of said filter drums, a feed valve for controlling the flow of material to each of said jet pipes, and means acting in time with said filter drum rotating means for opening one and closing the other of said valves for each drum and jet pipe in succession.

21. A filter comprising a conically bottomed tank adapted to hold the material to be filtered, a shaft centrally arranged in said tank, stirring blades on said shaft in the conical end of said tank, a plurality of filter drums rotatably arranged in said tank concentrically about said shaft, gearing arranged between said shaft and said filter drums to drive the latter from the former, a jet pipe adjacent each filter drum for directing a jet of the material to be filtered against said filter drum to dislodge the cake thereon, means for directing the loosened cake to the bottom of said tank, a pair of valves comprising a discharge valve for controlling the flow of filtrate from each of said filter drums and a feed valve for controlling the flow of material to each of said jet pipes, a cam on said shaft, and means operated by said cam for successively operating each pair of valves, one of the valves of each pair being closed and the other opened.

22. A filter comprising a tank adapted to hold the material to be filtered, a filter medium arranged in said tank, a substantially vertical pipe having a longitudinally disposed jet slot therein and arranged adjacent the filter medium, and means for intermittently introducing material to be filtered into the lower end of said jet pipe whereby a sheet jet of said material is directed against the cake accumulated on said filter medium during the non-jet period.

In testimony whereof, I have hereunto set my hand.

DAVID M. BERRY.